United States Patent [19]

Gruenberger et al.

[11] 4,158,174

[45] Jun. 12, 1979

[54] CIRCUIT ARRANGEMENT FOR THE PRODUCTION OF A CONTROL SIGNAL IN A RECEIVING CHANNEL WHICH IS SUBJECT TO INTERFERENCE

[75] Inventors: Gerhard Gruenberger; Heinz Merkle, both of Munich; Anton Sunkler, Otterfing, all of Fed. Rep. of Germany

[73] Assignee: Siemens Aktiengesellschaft, Berlin & Munich, Fed. Rep. of Germany

[21] Appl. No.: 814,886

[22] Filed: Jul. 12, 1977

[30] Foreign Application Priority Data

Jul. 13, 1976 [DE] Fed. Rep. of Germany ....... 2631460

[51] Int. Cl.² ............................................... H04B 1/16
[52] U.S. Cl. .................................... 325/404; 325/320; 329/122
[58] Field of Search ............... 325/400, 404, 407, 408, 325/320, 325; 329/104, 122

[56] References Cited

U.S. PATENT DOCUMENTS

| 3,806,815 | 4/1974 | Fletcher et al. | 325/320 |
| 3,970,945 | 7/1976 | Knapp | 325/320 |

Primary Examiner—Robert L. Griffin
Assistant Examiner—Tommy P. Chin
Attorney, Agent, or Firm—Hill, Gross, Simpson, Van Santen, Steadman, Chiara & Simpson

[57] ABSTRACT

A circuit arrangement for the production of a control signal, in particular a level regulation signal, in a receiving channel which is subject to interference, forms an amplitude-dependent control signal from the phase coded input signal. In the receiving channel a frequency regulating circuit has an oscillator which is synchronized by means of the received signal and the received signal is superheterodyned with the output signal of the oscillator in one mixer, directly, and delayed by 90° in another mixer. The mixed products are then fed through low-pass filters to obtain signals which indicate the frequency shift between the input signal frequency and the oscillator frequency, which signals are converted in a third mixer and serve for tuning the oscillator. The output signals obtained from the outputs of the two first-mentioned mixers, after being fed through low-pass filters, are squared and combined in a difference stage. The result is again passed through a low-pass filter and squared again before being fed to an addition stage. One input of the addition stage is obtained from the output signal of the third mixer, after squaring, and an amplitude correction stage is provided in front of another input of the addition stage to effect cancellation of the signal components arising from phase errors of the frequency regulating circuit and from the noise components in the useful signal. The interference-free output obtained is used as the control signal.

5 Claims, 5 Drawing Figures

CIRCUIT ARRANGEMENT FOR THE PRODUCTION OF A CONTROL SIGNAL IN A RECEIVING CHANNEL WHICH IS SUBJECT TO INTERFERENCE

BACKGROUND OF THE INVENTION

1. Field of the Invention

The present invention relates to a circuit arrangement for the production of a control signal, in particular for level regulation, in a receiving channel which is subject to interference. More particularly, the invention relates to such an arrangement wherein an amplitude-dependent control signal is derived from the phase coded input signal, wherein, in the receiving channel, a frequency regulating circuit contains an oscillator which is synchronized by means of the received signal, wherein the received signal is superheterodyned with the output signal from the oscillator in two mixers, on the one hand without delay and on the other hand with 90° delay, and wherein the mixed products are fed through low-pass filters to derive signals which indicate the frequency shift between the input signal frequency and the oscillator frequency, which signals, having been converted again in a third mixer, serve as a control value for the tuning of the oscillator.

2. Description of the Prior Art

For optimum signal processing, it is frequently desirable for the useful amplitude level in a receiving channel, which has interference superimposed thereon, to exhibit a specific value. This necessitates a control signal which acts on a corresponding adjusting element, e.g. a regulated amplifier, an adjustable threshold or the like. This applies, in particular, to radio receivers and especially to circuit arrangements which operate with carrier reconstruction of a phase coded digital signal. The control signal is to depend only upon the useful power of the received signal, and superimposed interference, e.g. noise or other interference, and likewise the superimposed information, are not to appear in the control signal.

There is a series of possibilities of constructing circuits for the production of the control signal in receiving channels of the type mentioned above which are subject to interference. However, these always involve the disadvantages which have been set forth in detail below in connection with FIG. 1. To summarize, however, it may be said that the known circuits either inadequately suppress the superimposed noise interference during the formation of the control signal, or that synchronization errors in the phase control loop influence the production of the control signal for the level regulation.

SUMMARY OF THE INVENTION

It is therefore the object of the invention, in a circuit arrangement of the type described above, to provide a way by which it is possible to obtain a control signal which is proportional only to the useful power in the received signal, and which is not subject to the influence of Gaussian noise or interference of a nature similar to noise, or to synchronization errors.

According to the invention, this object is achieved in that output signals obtained from the outputs of the two first-mentioned mixers, following low-pass filtering and squaring, are combined in a difference stage and, following a further low-pass filter and a further squaring stage, are fed to an additional stage which has a second input which is obtained from the output signal of the third mixer following squaring. In addition, prior to feeding the filtered and squared signals to the addition stage, an amplitude correction is effected in such a manner that a cancellation is obtained both of the signal components arising from the phase errors of the frequency regulating circuit and from noise signal components in the useful signal, and that the interference-free output signal obtained in this manner is employed as a control signal.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
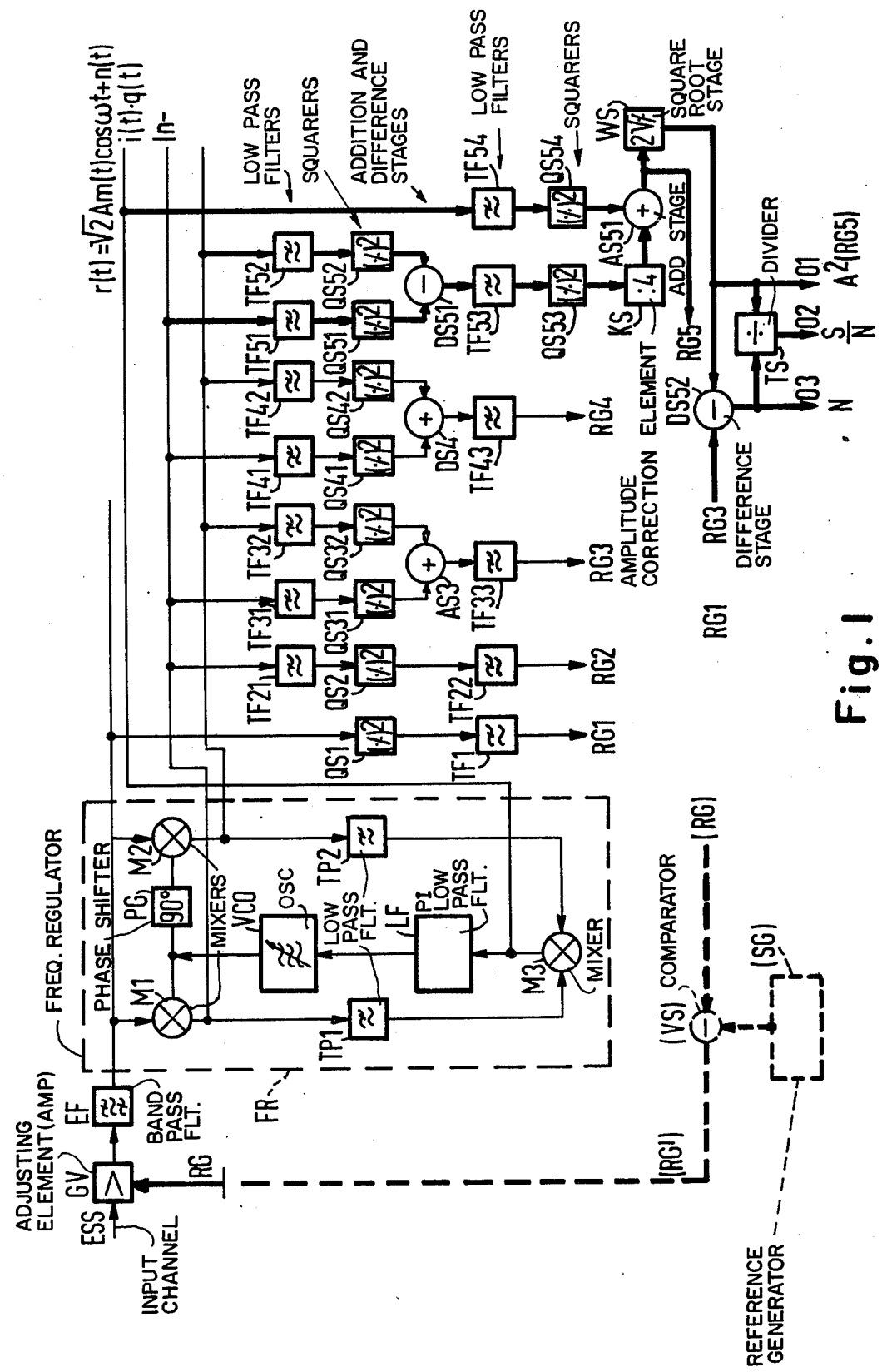
FIG. 1 is a schematic circuit diagram, including circuit variations, of an arrangement constructed in accordance with the present invention.

Referring to FIG. 1, an input signal which is subject to interference and which is supplied to the input channel, preferably of a radio receiver, is referenced ESS. This signal is a high frequency signal having phase coding. The input circuit contains an adjusting element GV which is actuated by a control signal RG which, in turn, is to depend solely upon the amplitude of the useful signal. This adjusting element can, in particular, be an adjustable amplifier (for the production of a constant output voltage) or a controllable threshold device. If regulating facilities are employed, as indicated by the heavy broken lines, the control signal RG must be supplied to a comparator circuit VS which is connected to the reference value generator SG and then forms the actual control voltage RG'. Having passed through an input filter EF, which is designed as a band-pass filter, the input signal ESS passes to a circuit which serves for frequency regulation in the carrier process, and which is referenced FR. This circuit, which is also known as a Costas circuit, represents a regulating circuit which is logically linked to the input signal in respect of frequency and phase. The regulating circuit comprises two parallel-connected mixers M1 and M2 which are supplied not only with the input signal ESS, but also with the output voltage from an adjustable oscillator VCO. One of the two mixers, in the present example the mixer M2, is preceded, with respect to the oscillator signal, by a phase element PG which effects a phase shift of 90°. This phase element ensures that the useful modulation which is additionally contained in the input signal ESS and which is formed by phasing does not influence the acquisition of the adjusting signal for the regulation of the oscillator VCO in the phase regulating circuit. The output signals from the two mixers M1 and M2 are fed to low-pass filters TP1 and TP2. The output signals from these low-pass filters are fed to a third mixer M3, the output signal of which is transmitted to a low-pass filter LF which has PI regulator characteristics. The output signals of the filter LF then represent the adjusting value for the frequency variation of the adjustable oscillator VCO. The circuit FR is preferably suitable for processing two-phase modulated (coded) digital signals.

In the following, in explanation of the difficulties which arise in the acquisition of the control signal RG, different circuit variations will be explained, the output signals of which could, in each case, represent the control signal, here referenced RG1–RG4, for the adjusting element GV. The derivation of the control signals RG1–RG4 in accordance with the following described methods 1–4 produces a series of disadvantages which will be explained in detail below. Identical components in different circuits have been provided with standard references which are:

QS = squaring stage
TF = low-pass filter
AS = addition stage
DS = difference stage.

METHOD 1

Referring to FIG. 1, for the realization of method 1 the received signal at the output of the band-pass filter EF $$r(t) = \sqrt{2} \cdot A \cdot m(t) \cdot \cos \omega t + n(t),$$

where $A^2$ represents the useful power, $m(t) = \pm 1$ describes the modulation by two-phasing, $\omega$ is the intermediate frequency and $n(t)$ represents the interference level, is squared in the square QS1 and fed through the low-pass filters TF1. The control signal RG1

$$z_1(t) \approx A^2 + E\{n^2(t)\} = A^2 + N$$

which has been obtained in this manner is proportional to the useful signal power with not too great of interference $n(t)$. The greater the interference, the more the interference power N contributes to the overall signal, and thus adulterates the desired signal. To this must be added the fact that the received signal ESS frequently cannot be sufficiently filtered in the band-pass filter EF, i.e. in accordance with the band width of the useful signal, because adapted, narrow-band filters cannot be constructed. The result is that an unnecessary quantity of interference power is active in the adjusting element GV, if the signal RG1 is employed as the control signal. Here, and in the following, the reference E signifies the anticipated value.

Method 2

The above disadvantage is avoided by obtaining the control signal RG2 from the signal converted into the base band at the output of the mixer M1

$$i(t) = A \cdot m(t) \cdot \cos \phi + n_i(t).$$

In the synchronous state, the synchronization error $\phi$ between the phase of the receiving oscillation and the reference oscillator VCO is zero, and having passed through the low-pass filter TF21, the squaring stage QS2, and a further low-pass filter TF22, the control signal RG2 is $$z_2(t) = A^2 \cdot \cos^2 \phi + E\{n_i^2(t)\} \approx A^2 \cdot \cos^2 \phi + N_i$$

The control signal RG2 is now influenced only by the interference power of a value $n_i(t)$. The interference power is less than in the case described in method 1, since an adapted low-pass filter can always be constructed. However, here a disadvantage is found in the dependence of the regulating criterion upon the synchronization error $\phi$. In unfavorable situations ($\phi = \pm \pi/2$) in that the quantity $i(t)$ contains no useful power.

Method 3

The dependence upon the synchronization error $\phi$ is avoided by a method in which the outputs of the two mixers M1 and M2 drive two parallel channels by way of the filters and squarers TF31, QS31 and TF32, QS32 which have outputs interconnected by an addition stage AS3 which is followed by a further low-pass filter TF33. In this case, from the quadrature channel, i.e. at the output of the mixer M2, $$q(t) = A \cdot m(t) \cdot \sin \phi + n_q(t)$$

is formed similarly to an auxiliary signal $$z_2'(t) \approx A^2 \cdot \sin^2 \phi + E\{n_q^2(t)\} \approx A^2 \cdot \sin^2 \phi + N_q$$

as in method 2. Since $\cos^2 \phi + \sin^2 \phi = 1$, the addition of $z_2(t)$ and $z_2'$ in the addition circuit AS3 produces $$z_3(t) \approx A^2 + E\{n_i^2(t)\} + E\{n_q^2(t)\} \approx A^2 + N_i + N_q$$

as a control signal RG3. Here, a disadvantage in comparison to method 2 resides in the additional adulteration of the control signal RG2 by the interference power of $n_2(t)$.

Method 4

The only difference between method 4 and method 3 is that a difference stage DS4 is provided in place of the addition stage AS3 as was the case in method 3.

The difference formation $$z_4(t) = z_2(t) - z_2'(t) \approx A^2 \cdot \cos^2 \phi$$

produces, as a fourth possibility, a control signal RG4 which is substantially freed of the interference noise because $$E\{n_i^2(t)\} = E\{n_q^2(t)\}.$$

However, the quantity $z_4(t)$ is again dependent upon the synchronization error $\phi$, and therefore is unsuitable as a control signal which represents useful power.

Method 5

In a method corresponding to the present invention, the above-described difficulties are avoided. For this purpose, the output of the mixer M1 is connected to a low-pass filter TF51 which feeds a squaring stage QS51. By the same token, the output of the mixer M2 is connected to a squaring stage QS52 by way of a low-pass filter TF52 as a quadrature channel. The output signals from the squaring stages QS51 and QS52 pass to a difference stage DS51, which subtracts the two output signals from one another. The difference signals obtained are fed to a low-pass filter TF53.

By means of an amplitude correcting element KS—in the present example an amplitude divider—the signal amplitudes are divided in the ratio 1:4. The difference signals obtained in this manner are fed to an addition circuit AS51. In place of the amplitude division, the amplitude could also be increased by the factor 4 prior to the input, containing the squaring stage QS54, of the addition circuit AS51. The control signal RG5 which is obtained in this manner at the output of the addition stage AS51 is dependent only upon the value A, thus upon the amplitude of the useful signal, and no longer upon the values $\phi$, i.e. the synchronization error, or n(t), i.e. noise components. Details in this respect will be given in the following with reference to equations. The control signal RG5 thus obtained can serve to produce an optimum setting of the adjusting element GV.

In accordance with a further development, the value $2\sqrt{\div}$ of the output signal of the addition stage AS51 can possibly be formed in a circuit WS. At the output 01 of the circuit WS there occurs a signal which is approximately equal to $A^2$. In many cases, in particular for continuous operation monitoring, the signal to noise ratio S/N (S=useful signal, N=noise) or the value N is required. For this purpose, from the value RG1 or RG3, a difference stage BS52 can obtain the value N alone from the output signal of the circuit WS at the output 03. A divider stage TS can provide the value S/N at the output 02.

It should be additionally mentioned that the two low-pass filters TF51 and TF52 need not be used if the squaring stages QS51 and QS52 are directly connected to the outputs of the low-pass filters TP1 and TP2 of the frequency regulating circuit FR.

Figure 2:
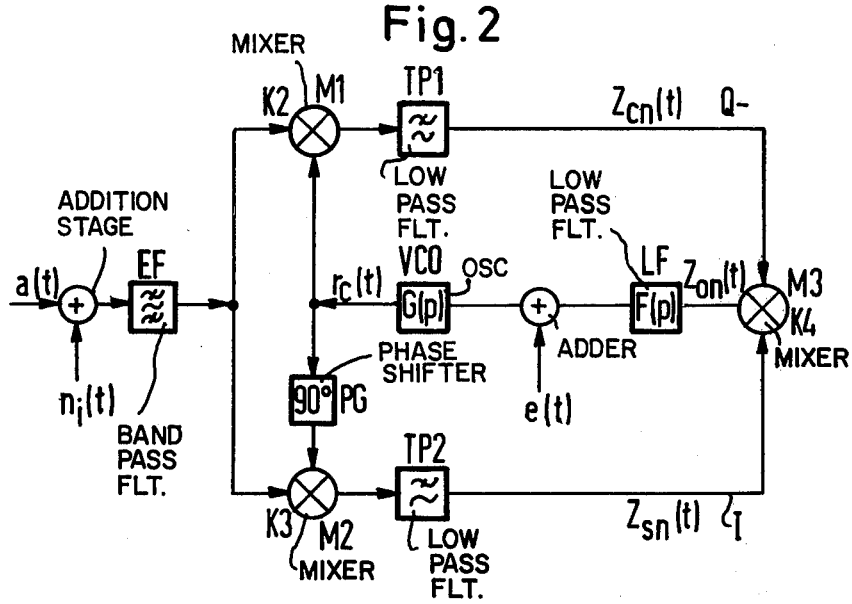
FIG. 2 is a schematic circuit diagram which illustrates details of the phase regulating circuit.

In explanation of the advantages which may be achieved by the present invention, as regards the formation of the control signal, reference should be taken to both FIGS. 1 and 2 in the following discussion. FIG. 2 basically illustrates the frequency regulating circuit FR of FIG. 1, and the same reference characters have been applied for corresponding components. In addition, the possible interference values have been represented as incoming values. The input signal consists of the useful component a(t) and the interference component $n_i(t)$. The band-pass filter EF at the input of the circuit filters out of the received signal the bandwidth B in which the useful signal is transmitted. The references $K_2$, $K_3$ and $K_4$ are attenuation and amplification factors of the mixers M1, M2 and M3. The low-pass filters TP1 and TP2 are designed in such a manner that they only block the sum frequency from the output of the mixers M1 and M2, although there frequency response has no influence worth mentioning upon the substantially lower difference frequency. The factors $K_2$, $K_3$ and $K_4$ have the value $V^{-1}$. The signal $Z_{on}(t)$ is present at the output of the mixer M3. This signal is fed to the filter LF which has the transmission function F(p). At the output of the filter LF, the value e(t) is added as a further signal (i.e. a hunting voltage for the acquisition phase). The signal obtained in this manner is supplied to the control oscillator VCO which has the transmission function G(p). The signal $r_c(t)$ is present at the output of the oscillator VCO.

Furthermore, the signals a(t) and $r_c(t)$ are extended in that phase instabilities $\psi_1$ of the transmitting oscillator VCO which supplies the received signal, $\psi_2$ of the regulated oscillator and interference effects d are taken into consideration:

$$a(t) = \sqrt{2} \cdot A \cdot u(t) \cdot \sin(\Delta + \psi_1 - d) \quad (1)$$

$$r_c(t) = 2 \cdot \sqrt{K_1} \cdot \cos(\theta + \psi_2) \quad (2)$$

Naturally, the instabilities $\psi_1$ and $\psi_2$ can also represent a frequency shift from the theoretical frequency.

If the oscillator VCO is operating in the proportional range, it alone is driven, and therefore:

$$U \sim \omega.$$

This proportionality constant which is determined with a volt meter and a frequency meter is referred to as $K_5/2$. The term $K_5$, which amounts to twice the measured value, is introduced in order to simplify later calculations.

Figure 3:
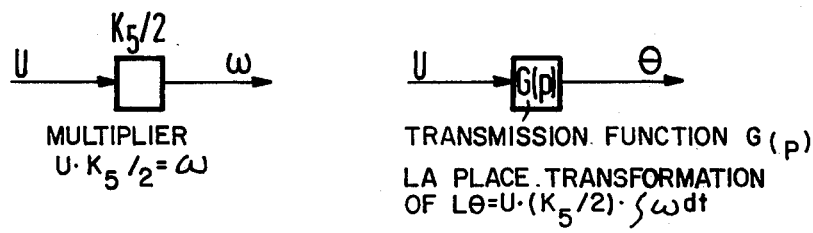
FIG. 3 is a pair of schematic diagrams which define transmission values.

The oscillator VCO can be described as illustrated in FIG. 3. In this case, the following equations apply.

$$U \cdot K_5/2 = \omega \quad (3)$$

$$\theta = \int \omega dt \quad (4)$$

When equation (3) is inserted into equation (4) it is obtained that:

$$\theta = U \cdot (K_5/2) \cdot \int \omega dt \quad (5)$$

by performing the Laplace transformation, the transmission function G(p) is:

$$\theta/U = (K_5/2) \int \omega dt \rightarrow \theta/U = (K_5/2) \cdot (1/p)$$

$$G(p) = \theta/U = (K_5/2) \cdot (1/p) \quad (6)$$

The component e(t) is a hunting voltage which tunes the oscillator VCO until synchronism is attained, i.e. $\phi = 0$, and then remains constant.

The component $n_i(t)$ describes a level, normally-distributed noise, which is added to the useful signal a(t). The bandpass filter EF ensures that only those noise components within the band width B of the transmitted signal reach the converters M1, M2. If it is assumed that $B << f_o$, and in practice this is generally so, the component $n_i(t)$ can be broken down into an envelope $N_i(t)$ and a random phase component $\delta_i(t)$ such that:

$$n_i(t) = \sqrt{2} \cdot N_i(t) \cdot \cos(\omega_o t + \delta_i(t)) = \sqrt{2} \cdot N_i(t) \cdot \cos \Delta_i. \quad (7)$$

This corresponds to a Fourier decomposition of the component $n_i(t)$:

$$n_i(t) = \sqrt{2} \cdot [n_c(t) \cdot \cos \omega_o t - n_s(t) \cdot \sin \omega_o t] \quad (8)$$

where $$n_c(t) = N_i(t) \cdot \cos \delta_i(t) \quad (9)$$

$$n_s(t) = N_i(t) \cdot \sin \delta_i(t) \quad (10)$$

If further trigonometrical conversion is carried out, one obtains $$n_i(t) = \sqrt{2} \cdot [N_c(t) \cdot \cos \Delta - N_s(t) \cdot \sin \Delta] \quad (11)$$

with the sine- and cosine components $$N_c(t) = n_c(t) \cdot \cos \delta + n_s(t) \cdot \sin \delta = N_i(t) \cdot \cos(\Delta_i - \Delta) \quad (12)$$

$$N_s(t) = n_s(t) \cdot \cos \delta - n_c(t) \cdot \sin \delta = N_i(t) \cdot \sin(\Delta_i - \Delta) \quad (13)$$

Figure 4:
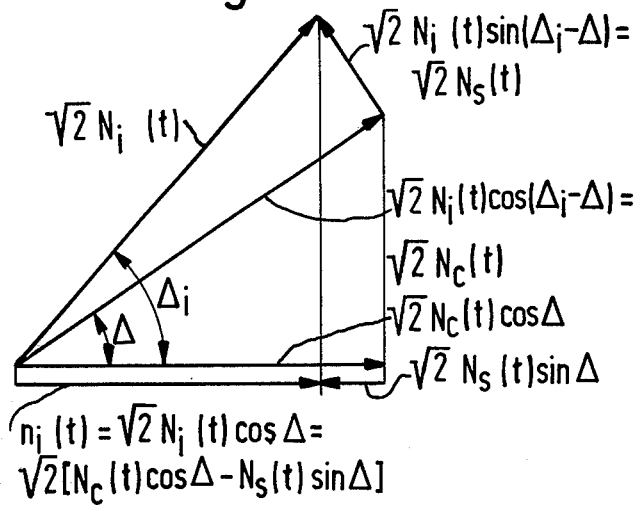
FIG. 4 is a vector diagram which is employed as an aid in explaining the invention.

Thus, the component $n_i(t)$ relates to the phase of the useful signal $\Delta = \omega_o t + \delta$. FIG. 4 is a diagram of this process.

The input signal $x(t)$ therefore becomes $$x(t) = a(t) + n_i(t) = \sqrt{2} \cdot \{[A \cdot u(t) - N_s(t)] \cdot \sin \Delta + N_c(t) \cdot \cos \Delta\}. \tag{14}$$

Including the transmission coefficients $K_2$, $K_3$, $K_4$ and taking into account the equation $u^2(t) = 1$, one obtains $$Z_{cn}(t) = a(t) \cdot r_c(t) \cdot K_2 = K_2 \cdot \sqrt{2K_1} \cdot [A \cdot u(t) \cdot \sin \phi - N_s(t) \cdot \sin \phi + N_c(t) \cdot \cos \phi] \tag{15}$$

$$Z_{sn}(t) = a(t) \cdot r_s(t) \cdot K_3 = K_3 \cdot \sqrt{2K_1} \cdot [A \cdot u(t) \cdot \cos \phi - N_s(t) \cdot \cos \phi - N_c(t) \cdot \sin \phi] \tag{16}$$

$$Z_{on}(t) = Z_c(t) \cdot Z_s(t) \cdot K_4 = K_1 \cdot K_2 \cdot K_3 \cdot K_4 \cdot \{[A^2 + N_s^2(t) - N_c^2(t) - 2 \cdot A \cdot u(t) N_s(t)] \cdot \sin 2\phi + 2 \cdot [A \cdot u(t) - N_s(t)] N_c(t) \cdot \cos 2\phi\} \tag{17}$$

If the equivalent value $N_a(t)$ possessed by all of the processes which are subject to noise is introduced, equation (17) can be simplified to:

$$Z_{on}(t) = K_1 \cdot K_2 \cdot K_3 \cdot K_4 [A^2 \cdot \sin 2\phi + N_a(t)] = [Z_o(t) + N_a(t)] \cdot K_o \tag{18}$$

with $$N_a(t) = [N_s^2(t) - N_c^2(t) - 2 \cdot A \cdot u(t) N_s(t)] \cdot \sin 2\phi + 2[A \cdot u(t) - N_s(t)] N_c(t) \cos 2\phi \tag{19}$$

and $$K_o = \prod_{i=1}^{4} K_i \tag{20}$$

Figure 5:
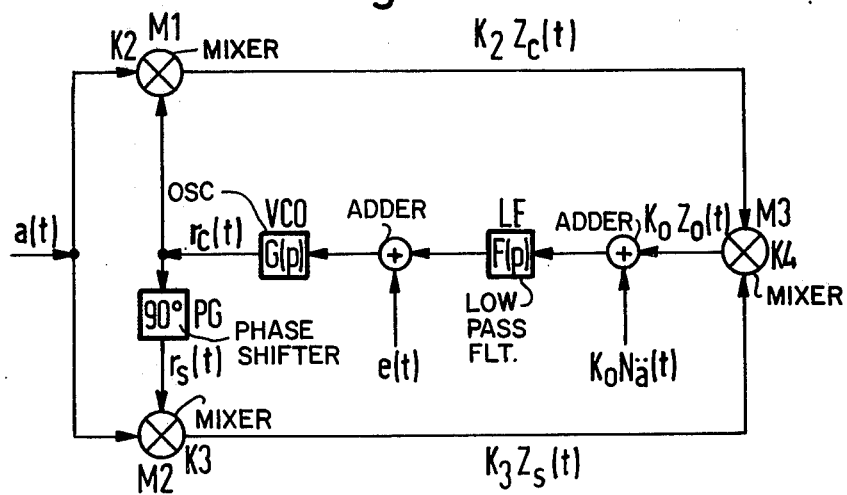
FIG. 5 is a schematic circuit diagram which illustrates a modification of the circuit of FIG. 2.

By breaking down equation (18), the addition point for the noise value can be displaced elsewhere, as the summation $$K_o \cdot N_a(t) + K_o \cdot Z_o(t) \tag{21}$$

prior to the filter LF, as illustrated in FIG. 5, is mathematically synonymous with the summation $a(t) + n_i(t)$ at the input of the coherent converter FR.

The addition point for the equivalent noise value $N_a(t)$ is in front of the filter LF and behind the mixer M3. The relevant multipliers M1, M2 with the following low-pass filters TP1 and TP2 are grouped thereafter.

If the equations (15) and (16) are considered in the synchronous case of $\phi = 0$, the component $Z_{cn}(t)$ obtains no part of the useful signal. This arm of the circuit is (compare with FIG. 2) referred to as the quadrature channel Q, and the other branch $C_{sn}(t)$ in which the full signal amplitude prevails is referred to as the inphase channel I. In the following calculations, the transmission coefficients are:

$$K_1 = (\tfrac{1}{2}) \cdot V^2, \; K_2 = 1 \cdot V^{-1}, \; K_3 = 1 \cdot V^{-1}, \; K_4 = \tfrac{1}{2} \cdot V^{-1}$$

and $$I = Z_{sn}(t) \tag{21}$$

$$Q = Z_{cn}(t) \tag{22}$$

$$I \cdot Q = Z_{on}(t) \tag{23}$$

The quantity $I \cdot Q$ is already known to be $Z_{on}(t)$ as set forth in equation (17) so that $$I \cdot Q = (\tfrac{1}{2})[A^2 + N_s^2(t) - N_c^2(t) - 2 \cdot A \cdot u(t) \cdot N_s(t)] \cdot \sin 2\phi + (\tfrac{1}{2})[A \cdot u(t) \cdot N_c(t) - N_s(t) \cdot N_c(t)] \cdot \cos 2\phi \tag{24}$$

If the squares of the signals in the I and Q channels are formed in the circuit components QS51 and QS52 in FIG. 1, one obtains:

$$I^2 = [A^2 \cdot \cos^2 \phi + N_s^2(t) \cdot \cos^2 \phi + N_c^2(t) \cdot \sin^2 \phi + 2 \cdot A \cdot u(t) \cdot N_c(t) \cdot \sin \phi \cdot \cos \phi - 2 \cdot A \cdot u(t) \cdot N_s(t) \cdot \cos^2 \phi + 2 N_s(t) \cdot N_c(t) \cdot \sin \phi \cos \phi] \tag{25}$$

$$Q^2 = [A^2 \cdot \sin^2 \phi + N_s^2(t) \cdot \sin^2 \phi + N_c^2(t) \cdot \cos^2 \phi + 2 \cdot A \cdot u(t) \cdot N_c(t) \cdot \sin \phi \cdot \cos \phi - 2 \cdot A \cdot u(t) \cdot N_s(t) \cdot \sin^2 \phi - 2 N_s(t) \cdot N_c(t) \cdot \sin \phi \cdot \cos \phi] \tag{26}$$

If one subtracts equation (26) from equation (25) in the difference stage DS51 in FIG. 1 and combines whereby $$I^2 - Q^2 = [A^2 \cdot \cos 2\phi + N_s^2(t) \cdot \cos 2\phi - N_c^2(t) \cdot \cos 2\phi - 2 \cdot A \cdot u(t) \cdot N_s(t) \cdot \cos 2\phi + 2 N_s(t) \cdot N_c(t) \cdot \sin 2\phi] \tag{27}$$

one obtains a signal which possesses the value zero, i.e. with adequate low-passing filtering is only dependent upon $\cos 2\phi$. The two expected values $E\{N_s^2(t)\}$ and $E\{N_c^2(t)\}$ compensate one another only when the amplifications $K_2$ and $K_3$ in the mixers M1 and M2, as has been here assumed, are equal. In the case of the other values, two uncorrelated signals, when multiplied with one another, produce the expected value zero.

If the signals in equations (24) and (27) are sufficiently filtered with a low-pass filter, one obtains $$E\{I \cdot Q\} = (\tfrac{1}{2}) \cdot A^2 \cdot \sin 2\phi \tag{28}$$

and $$E\{I^2 - Q^2\} = A^2 \cdot \cos 2\phi \tag{29}$$

Having been squared in the squarers QS53 and QS54, the signals corresponding to equations (28) and (29), taking into account the amplitude correction in the amplitude correcting element KS, produce a value which is only proportional to A, at the output of the addition stage AS51.

If in the stage WS the signal $A^2$ is formed as $$2 \cdot \sqrt{[E\{I \cdot Q\}]^2 + \left[\frac{E\{I^2 - Q^2\}}{2}\right]^2} = A^2 \tag{30}$$

the output signal at the terminal 01 in FIG. 1, (and thus also RG5) is independent of the phase. This equation is valid when the circuit FR is synchronous; no coherence is necessary on the other hand (i.e. every phase error $\phi$ is permissible). The estimated value of the useful power is increasingly accurate, the deeper the cut-off frequency of the low-pass filters is selected to be, as then the mathematical operation $E\{Z\}$ is approximated with increasing accuracy.

If equations (25) and (26) are added, as indicated at the input of the stage DS52 in FIG. 1 by the component RG3, one obtains $$I^2 + Q^2 = [A^2 + N_s^2(t) + N_c^2(t) + 2 \cdot A \cdot u(t) \cdot N_c(t) \cdot \sin 2\phi - 2 \cdot A \cdot u(t) \cdot N_s(t)] \tag{31}$$

If the value is formed, one obtains $$E\{I^2 + Q^2\} = [A^2 + E\{N_s^2(t)\} + E\{N_c^2(t)\}] \qquad (32)$$
$$= [A^2 + N]$$

the sum of signal power $A^2$ and noise power $N$.

Here it has been assumed that with a normally distributed noise:

$$E\{N_s^2(t)\} = R_{Ns}(0) \qquad (33)$$
$$= \lim_{T \to \infty} (1/T) \int_{T/2}^{T/2} N_s^2(t) \cdot dt$$
$$= (1/2\pi j) \int_{-j\infty}^{j\infty} S_{Ns}(\omega) \cdot dp$$
$$= N/2$$

The same also applies to the component $N_c(t)$ such that $$E\{N_c^2(t)\} = N/2. \qquad (34)$$

Now it is simply necessary to subtract the signal power $A^2$ in the circuit DS52 of FIG. 1 in order to obtain a gauge of the value of the noise power N, which is frequently additionally required (e.g. for a continuous operating check and/or interference recognition), at the output 03 in FIG. 1:

$$E\{I^2 + Q^2\} - 2\sqrt{[E\{I \cdot Q\}]^2 + \left[\frac{E\{I^2 - Q^2\}}{2}\right]^2} = N. \qquad (35)$$

The quotient which is formed in the divider circuit TS supplies the signal to noise ratio S/N. This value is also frequently additionally required, and this in an extension of the invention it is easily possible also to obtain the values N and S/N. The value $z_3(t)=RG3$ can readily be obtained if an addition stage (not illustrated) is connected to the output of the squarers QS51 and QS52, the output of which stage is to be connected to the second input of the stage DS52. As described in the case of method 1, the value RG1 can likewise easily be determined and used to form the values N and S/N.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a circuit arrangement for the production of a level regulation control signal of the type wherein a receiving channel receives an input signal which is subject to interference and includes means for forming an amplitude-dependent control signal from a phased input signal, wherein the receiving channel comprises a frequency regulating circuit including an oscillator which is synchronized by the received signal which is superheterodyned by the received signal in first and second mixers with the oscillator output signal directly and with a 90° phase shift, respectively, and wherein the mixing products are fed through first low pass filters to obtain signals which indicate the frequency shift between the input signal frequency and the oscillator frequency and then fed via a third mixer to obtain an adjusting control signal for tuning the oscillator, the improvement therein comprising:

second low pass filters connected to respective outputs of the first and second mixers, respectively;

first squarers connected to said second low pass filters;

a difference stage connected to said first squarers;

a third low pass filter connected to said difference stage;

a second squarer connected to the output of said third low pass filters;

a fourth low pass filter connected to the output of said third mixer;

a third squarer connected to said fourth low pass filter;

an addition stage including one input connected to said second quarter and another input connected to said third squarer; and an amplitude correction circuit interposed between said second squarer and said other input of said addition stage to cancel phase error signal components and noise components of the input signal and provide an error-free output signal from said addition stage.

2. The improved circuit arrangement of claim 1, comprising:

correcting means connected to said addition stage for producing an output signal which is proportional to the power of the error-free output signal.

3. The improved circuit arrangement of claim 2, comprising:

a further difference stage connected to said correcting means; and means for low-pass filtering, squaring and adding the outputs of the first and second mixers, connected to said further difference means, said further difference means operable to provide an output signal which is dependent only upon the interference power.

4. The improved circuit arrangement of claim 3, comprising:

division means connected to said further difference stage and to said correcting means and operable to provide a signal representing the signal-to-noise ratio.

5. In a circuit arrangement for the production of a level regulation control signal of the type wherein a receiving channel receives an input signal which is subject to interference and includes means for forming an amplitude-dependent control signal from a phased input signal, wherein the receiving channel comprises a frequency regulating circuit including an oscillator which is synchronized by the received signal which is superheterodyned by the received signal in first and second mixers with the oscillator output signal directly and with a 90° phase shift, respectively, and wherein the mixing products are fed through first low pass filters to obtain signals which indicate the frequency shift between the input signal frequency and the oscillator frequency and then fed via a third mixer to obtain an adjusting control signal for tuning the oscillator, the improvement therein comprising:

second low pass filters connected to respective outputs of the first and second mixers, respectively;

first squarers connected to the second low pass filters, respectively;

a difference stage connected to said first squarers;

a third low pass filter connected to said difference stage;
a second squarer connected to said third low pass filter;
a fourth low pass filter connected to the output of said third mixer;
a third squarer connected to said fourth low pass filter; an addition stage including one input connected to said second squarer and another input connected to said third squarer; and
an amplitude correction circuit interposed between said second squarer and said other input of said addition stage to cancel phase error signal components and noise components of the input signal and provide an error-free output signal from said addition stage.

* * * * *